US012367805B2

(12) United States Patent
Li et al.

(10) Patent No.: US 12,367,805 B2
(45) Date of Patent: Jul. 22, 2025

(54) DATA SIGNAL REGULATING CIRCUIT AND DISPLAY DEVICE

(71) Applicant: TCL China Star Optoelectronics Technology Co., Ltd., Guangdong (CN)

(72) Inventors: Wenfang Li, Guangdong (CN); Xianming Zhang, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 448 days.

(21) Appl. No.: 17/266,662

(22) PCT Filed: Dec. 30, 2020

(86) PCT No.: PCT/CN2020/141473
§ 371 (c)(1),
(2) Date: Sep. 26, 2023

(87) PCT Pub. No.: WO2022/141214
PCT Pub. Date: Jul. 7, 2022

(65) Prior Publication Data

US 2024/0046849 A1 Feb. 8, 2024

(30) Foreign Application Priority Data

Dec. 29, 2020 (CN) ......................... 202011591877.4

(51) Int. Cl.
*G09G 3/20* (2006.01)
*G09G 3/36* (2006.01)

(52) U.S. Cl.
CPC ......... *G09G 3/2096* (2013.01); *G09G 3/2007* (2013.01); *G09G 3/36* (2013.01); *G09G 3/3688* (2013.01); *G09G 2320/0673* (2013.01)

(58) Field of Classification Search
CPC ...... G09G 3/2096; G09G 3/2007; G09G 3/36; G09G 3/3688; G09G 2320/0673; G09G 2300/0426; G09G 3/3696; G09G 2320/0223; G09G 2320/0233
See application file for complete search history.

(56) References Cited

U.S. PATENT DOCUMENTS

| | | | | |
|---|---|---|---|---|
| 8,212,803 B2 * | 7/2012 | Hong | .................. | G09G 3/3648 345/87 |
| 10,235,922 B2 * | 3/2019 | Hu | ...................... | G09G 3/2007 |
| 10,269,284 B2 * | 4/2019 | Jung | ..................... | G06F 3/0412 |

(Continued)

FOREIGN PATENT DOCUMENTS

| | | |
|---|---|---|
| CN | 106782265 | 5/2017 |
| CN | 107665666 | 2/2018 |

(Continued)

*Primary Examiner* — Michael J Jansen, II

(57) ABSTRACT

A data signal regulating circuit and a display device are disclosed. The data signal regulating circuit is applied to a display panel including a plurality of source driver groups, a feedback unit and an regulating unit. Any two adjacent ones of the source driver groups are provided with a data signal regulating circuit. The feedback unit is used to output a feedback signal to the regulating unit according to data signal difference between two adjacent source driver groups. The regulating unit is used to regulate the data signals output from the corresponding source driver groups according to the feedback signal.

16 Claims, 5 Drawing Sheets

(56) References Cited

U.S. PATENT DOCUMENTS 10,636,348 B2 * 4/2020 Kim .......................... G09G 3/20
10,762,873 B2 9/2020 Hu et al.
10,943,536 B2 * 3/2021 Wang .................... G09G 3/3233
11,094,280 B2 * 8/2021 Jang ...................... G09G 3/3688
11,145,236 B2 * 10/2021 Baek ..................... G09G 3/2007
11,423,849 B2 * 8/2022 Huang .................. G09G 3/3291
11,645,957 B1 * 5/2023 Wetherell ............. G09G 3/3283 345/214
11,657,742 B1 * 5/2023 Akyol ................... G09G 3/3258 345/55
11,735,122 B2 * 8/2023 Kim ...................... G09G 3/3275 345/204
11,783,739 B2 * 10/2023 Akyol ..................... G09G 3/006 324/500
2010/0156879 A1 * 6/2010 Hong .................... G09G 3/3648 345/213
2011/0148842 A1 6/2011 Nakayama
2013/0113777 A1 * 5/2013 Baek ....................... G09G 5/008 345/212
2015/0279524 A1 10/2015 Feng et al.
2018/0061299 A1 * 3/2018 Jung ..................... G09G 3/3688
2018/0122295 A1 * 5/2018 Kim .......................... G09G 3/20
2018/0211581 A1 * 7/2018 Hu ............................ G09G 3/20
2020/0074924 A1 * 3/2020 Wang .................... G09G 3/3233
2021/0020137 A1 * 1/2021 Jang ...................... G09G 3/3677
2021/0118352 A1 * 4/2021 Baek ..................... G09G 3/2007
2021/0295785 A1 * 9/2021 Huang .................. G09G 3/3233
2022/0076599 A1 * 3/2022 Akyol ..................... G09G 3/006
2022/0180815 A1 * 6/2022 Kim ...................... G09G 3/3233

FOREIGN PATENT DOCUMENTS

CN 109243355 1/2019
CN 109493784 3/2019
CN 111627396 9/2020
CN 112053651 12/2020
CN 111091778 1/2022

* cited by examiner

DATA SIGNAL REGULATING CIRCUIT AND DISPLAY DEVICE

RELATED APPLICATIONS

This application is a National Phase of PCT Patent Application No. PCT/CN2020/141473 having International filing date of Dec. 30, 2020, which claims the benefit of priority of Chinese Patent Application No. 202011591877.4 filed on Dec. 29, 2020. The contents of the above applications are all incorporated by reference as if fully set forth herein in their entirety.

FIELD AND BACKGROUND OF THE INVENTION

This application relates to the field of display technology, and more particularly to a data signal regulating circuit and display device.

Liquid Crystal Display (LCD), as a common electronic device featured of low power consumption, small size, and light weight is commonly favorable. Along with consumer demands and technological development, LCDs are increasingly getting larger panel size and greater refresh rate, and thus require more and more LCD driver chips, such as source driver integrated circuits (ICs). To meet the requirement, a gamma voltage generation unit is provided to generate so called gamma voltage to each source driver chip. However, as the distance of each source driver chip from the gamma voltage generation unit is different, gamma voltage delivery leads to voltage changes, including gamma voltage drop and other issues, resulting screen split phenomenon in various display devices during displaying.

Hence, the current technology is defective and in urgent need of improvement.

SUMMARY OF THE INVENTION

Technical Problems

The present application provides a data signal regulating circuit and a display device that can effectively address the phenomenon of screen splitting, thereby improving display functioning of a display device.

Technical Solutions

In a first aspect, the application provides a data signal regulating circuit for a display panel. The display panel comprises a plurality of source driver groups arranged sequentially in a predetermined direction. Each of the source driver groups comprises at least one source driver unit. Any two adjacent ones of the source driver groups are correspondingly provided with an instance of the data signal regulating circuit.

The data signal regulating circuit comprises an electrically interconnected feedback unit and a regulating unit.

The feedback unit is further respectively electrically connected to two corresponding adjacent source driver groups among the source driver groups, and configured to obtain data signal difference of the two adjacent source driver groups and output a feedback signal to the regulating unit based on the data signal difference.

The regulating unit is further respectively electrically connected to the two adjacent source driver groups, and configured to respectively output a regulation signal to the two adjacent source driver groups, to regulate data signals output by the two adjacent source driver groups according to the feedback signal.

In the data signal regulating circuit of the application, the two adjacent the source driver groups after being regulated by the data signal regulating circuit output identical data signals.

In the data signal regulating circuit of the application, each of the source driver groups comprises a plurality of source driver units arranged sequentially in the predetermined direction. Source driver units in the same source driver group output identical data signals.

The feedback unit is electrically connected to any one of the source driver units in each of the two corresponding adjacent source driver groups. The regulating unit is electrically connected to each of the source driver units in the two corresponding adjacent source driver groups.

In the data signal regulating circuit of the application, the feedback unit comprises an electrically interconnected operational amplifier and a comparator.

The operational amplifier is configured to detect and amplify the data signal difference of the two adjacent the source driver groups.

The comparator is configured to compare magnitude of the amplified data signal difference with a reference voltage, and to output the feedback signal to the regulating unit when the amplified data signal difference deviates from the reference voltage.

In the data signal regulating circuit of the application, the feedback signal comprises a low voltage level signal.

In the data signal regulating circuit of the application, a first input and a second input of the operational amplifier are electrically connected to two corresponding adjacent the source driver groups, and an output of the operational amplifier is electrically connected to a first input of the comparator.

A second input of the comparator is connected to the reference voltage, and an output of the comparator is electrically connected to the regulating unit.

In the data signal regulating circuit of the application, the regulating unit is electrically connected to the source driver units via a CPSI signal line.

In the data signal regulating circuit of the application, wherein the regulating unit comprises a timing control unit.

In the data signal regulating circuit of the application, the regulation signal comprises gray scale data.

In a second aspect, the application provides a display device comprising a display panel and a data signal regulating circuit. The data signal regulating circuit is located on one side of the display panel.

The display panel comprises a plurality of source driver groups arranged sequentially in a predetermined direction. Each of the source driver groups comprises at least one source driver unit. Any two adjacent ones of the source driver groups are correspondingly provided with an instance of the data signal regulating circuit.

The data signal regulating circuit comprises an electrically interconnected feedback unit and a regulating unit.

The feedback unit is further respectively electrically connected to two corresponding adjacent source driver groups among the source driver groups, and configured to obtain data signal difference of the two adjacent source driver groups and output a feedback signal to the regulating unit based on the data signal difference.

The regulating unit is further respectively electrically connected to the two adjacent source driver groups, and configured to respectively output a regulation signal to the two adjacent source driver groups, to regulate data signals output by the two adjacent source driver groups according to the feedback signal.

In the display device of the application, the data signals output by the two adjacent source driver groups after being regulated by the data signal regulating circuit are identical.

In the display device of the application, each of the source driver groups comprises a plurality of source driver units arranged sequentially in the predetermined direction. Source driver units in the same source driver group output identical data signals.

The feedback unit is electrically connected to any one of the source driver units in each of the two corresponding adjacent source driver groups, and the regulating unit is electrically connected to each of the source driver units in the two corresponding adjacent source driver groups.

In the display device of the application, the feedback unit comprises an electrically interconnected operational amplifier and a comparator.

The operational amplifier is configured to detect and amplify the data signal difference of the two adjacent the source driver groups.

The comparator is configured to compare magnitude of the amplified data signal difference with a reference voltage, and to output the feedback signal to the regulating unit when the amplified data signal difference deviates from the reference voltage.

In the display device of the application, a first input and a second input of the operational amplifier are electrically connected to two corresponding adjacent the source driver groups, and wherein an output of the operational amplifier is electrically connected to a first input of the comparator.

A second input of the comparator is connected to the reference voltage, and an output of the comparator is electrically connected to the regulating unit.

In the display device of the application, the regulating unit is electrically connected to the source driver units via a CPSI signal line.

In the display device of the application, the regulating unit comprises a timing control unit.

In the display device of the application, the display device further comprises a plurality of printed circuit boards arranged sequentially in the predetermined direction, the plurality of source driver groups being provided on the plurality of printed circuit boards in one to one correspondence.

The feedback unit and any one of the two adjacent the source driver groups are provided on the same the printed circuit board.

In the display device of the application, the display device further comprises a gamma voltage generation unit electrically connected to the plurality of printed circuit boards, the gamma voltage generation unit provides a raw gamma signal to each of the plurality of source driver groups through the plurality of printed circuit boards.

In the display device of the application, at least two adjacent printed circuit boards are electrically interconnected through a flexible line.

In the display device of the application, the regulation signal comprises gray scale data.

Beneficial Effect

Compared with the prior art, the data signal regulating circuit and the display device provided in this application use the data signal regulating circuit to adjust the data signals output by two adjacent source driver units in the display panel, so that the data signals output by different source driver units are made identical, effectively ameliorating the display screen split phenomenon and thus improving display performance of the display device.

BRIEF DESCRIPTION OF THE SEVERAL VIEWS OF THE DRAWINGS

To clear disclose the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort.

DESCRIPTION OF SPECIFIC EMBODIMENTS OF THE INVENTION

Figure 1:
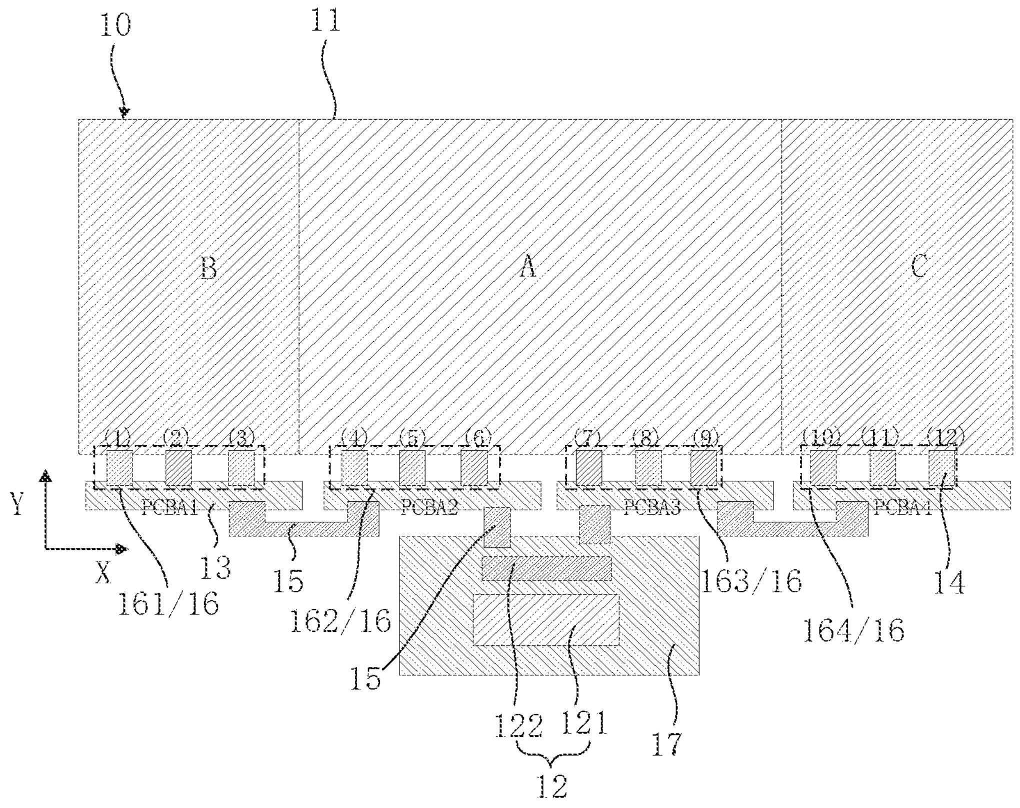
FIG. 1 is a schematic diagram showing a structural view of an example of a display device provided by an embodiment of the present application.

The following is a clear and comprehensive description of the technical solutions in the embodiments of this application with reference to the drawings in the embodiments of the application. Obviously, the embodiments described are only part of this application, not for exhaustive illustration. Based on the embodiments of the application, other embodiments which may be easily obtained by those having ordinary skills in the art without paying additional creative effort fall within the scope of the application for protection.

In the description of the present disclosure, it is to be understood that orientations or positional relationships indicated by the terms “center”, “longitudinal”, “lateral”, “length”, “width”, “thickness”, “up”, “down”, “front”, “rear”, “left”, “right”, “vertical”, “horizontal”, “top”, “bottom”, “inside”, “outside”, “clockwise”, “counterclockwise”, etc., are based on the orientations or positional relationships illustrated in the drawings, and are merely for the convenience of the description of the present disclosure and simplifying the description, rather than indicating or implying that the devices or components referred to must have a specific orientation, be constructed and operated in a specific orientation. Therefore, it should not be construed as limiting the present disclosure. Moreover, the terms “first” and “second” are used for descriptive purposes only and cannot to be construed as indicating or implying a relative importance or implicitly indicating the number of technical features indicated. Thus, features defined as “first” or “second” may include one or more of the described features either explicitly or implicitly. In the description of the present disclosure, the meaning of "a plurality of/multiple" is two or more, unless otherwise specifically defined.

In the description of the present disclosure, it should be noted that, unless otherwise specified and defined, the terms "mounted", "connected", and "connection" should be understood broadly. For example, they may be a fixed connection, a detachable connected, indirectly connected through intermediaries, or an internal communication of two components or an interaction between two components. For those skilled in the art, the specific meanings of the above terms in the present disclosure may be understood according to specific circumstances.

In the present disclosure, unless otherwise specified and defined, a first feature "on" or "under" a second feature may include direct contact between the first and second features, and may also include that the first and second features are not in direct contact but are contacted through additional features between them. Moreover, the first feature "above", "over" and "on top of" the second feature includes the first feature directly above and indirectly above the second feature, or merely indicates that the level of the first feature is higher than that of the second feature. The first feature "below", "under" and "at the bottom of" the second feature includes the first feature directly below and indirectly below the second feature, or merely indicates that the level of the first feature is lower than the second feature.

The following disclosure provides many different embodiments or examples for implementing different structures of the present disclosure. In order to simplify the disclosure of the present disclosure, the components and arrangements of the specific examples are described below. Of course, they are merely examples and are not intended to limit the invention. In addition, the present disclosure may be repeated with reference to the numerals and/or reference letters in various examples, which are for the purpose of simplicity and clarity, and do not indicate the relationship between the various embodiments and/or arrangements discussed. Moreover, the present disclosure provides examples of various specific processes and materials, but those of ordinary skill in the art may be aware of the application of other processes and/or the use of other materials.

FIG. 1 shows a schematic diagram showing a structural view of an example of display device. As shown in FIG. 1, a display device 10 includes a display panel 11 and a driver circuit 12. In particular, a pixel circuit (not shown) is provided in a display area of the display panel 11. The driver circuit 12 is provided on one side of the display area of the display panel 11 and is electrically connected to the pixel circuit in the display area of the display panel 11 to provide a data signal Vdata to the pixel circuit.

Specifically, the display panel 11 may be but not limited to a liquid crystal display panel.

The display device 10 includes a plurality of printed circuit boards (printed circuit board assembly, PCBA) 13 formed on different segments on one side of the display panel 11. The plurality of printed circuit boards 13 arranged in a predetermined direction (X direction) in a one-dimensional array, where each printed circuit board 13 is provided with at least one source driver unit 14, and two adjacent printed circuit boards 13 are electrically interconnected through a flexible circuit 15. Of course, the source driver units 14 can also be lapped on the corresponding printed circuit boards 13 but not limited thereto.

The drive circuit 12 includes a timing control unit 121 and a gamma voltage generation unit 122. The timing control unit 121 is electrically connected to the source driver unit 14 and outputs external input data to the source driver unit 14. The gamma voltage generation unit 122 is electrically connected to the source driver unit 14 and generates and transmits gamma voltage to the source driver unit 14. The source driver unit 14 receives the external input data and gamma voltage, and outputs the data signal Vdata to the pixel circuit to drive the display panel 11 to display normally.

For the convenience of description, FIG. 1 only shows four printed circuit boards 13, such as PCBA1, PCBA2, PCBA3 and PCBA4 arranged in order from left to right. Each printed circuit board 13 is equipped with three source driver units 14 but are not limited thereto in an actual manufacture process. The three source driver units 14 are arranged in a one-dimensional array in a predetermined direction on a corresponding printed circuit board 13. As every three source driver units 14 on each printed circuit board 13 are treated as one source driver group 16, each printed circuit board 13 can have one source driver group 16. The four source driver groups 16 are, from left to right, a first source driver group 161, a second source driver group 162, a third source driver group 163, and a fourth source driver group 164. The source driver units 14 in the first source driver group 161, the second source driver group 162, the third source driver group 163, and the fourth source driver group 164 are arranged from left to right in the X direction and denoted as (1) to (12).

In a specific embodiment, the timing control unit 121 and the gamma voltage generation unit 122 in the driver circuit 12 are located corresponding to PCBA2 and PCBA3, and the timing control unit 121 and gamma voltage generation unit 122 are located on a circuit board 17, which is located on one side of the printed circuit board 13 away from the display panel 11. The material of the circuit board 17 can be the same as that of a PCBA. The material of the board 17 can be the same as, but not limited to, the material of the PCBA. In particular, the gamma voltage generation unit 122 is electrically connected to PCBA2 and PCBA3 respectively via the flexible line 15. Additionally, the PCBA1, PCBA2, PCBA3, and PCBA4 are also electrically connected via the flexible line 15, so that the gamma voltage generation unit 122 transmits gamma voltage to the source driver unit 14 on the PCBA1, PCBA2, PCBA3 and PCBA4 respectively. Of course, in another specific embodiment, the gamma voltage generation unit 122 can also be directly electrically connected to PCBA1 and PCBA4 via the flexible line 15. As a result, the flexible line 15 may not be required to connect PCBA1 and PCBA2 and connect PCBA3 and PCBA4.

It can be understood that PCBA2 and PCBA3 are closer to gamma voltage generation unit 122, and PCBA1 and PCBA4 are farther away from gamma voltage generation unit 122. Therefore, the second source driver group 162 and the third source driver group 163 located on PCBA2 and PCBA3, respectively, can be used as a local source driver group, and the first source driver group 161 and the fourth source driver group 164 located on PCBA1 and PCBA4, respectively, can be used as a remote source driver group.

It should be noted that the number of local source driver groups and the number of remote source driver groups of this application can be determined according to an actual manufacture process and the distance from gamma voltage generation unit 122, and thus are limited hereto.

Since the two printed circuit boards 13 are connected and transmit signals through the flexible circuit 15, the intrinsic impedance of the flexible circuit 15 and the contact impedance of the interface terminals on the printed circuit boards 13 and 17 intensify the gamma voltage drop at both ends of the flexible circuit 15, which makes the gamma voltage received by the source driver unit 14 in the remote source driver group differ from the gamma voltage received by the source driver unit 14 in the local source driver group, and causes inconsistent display. For example, when multiple pixels in the display panel 11 display a monochrome screen with the same gray scale, the voltage drop can cause the display screen to split. In a specific example, the display screens B and C of the remote source driver group (that is, the first source driver group 161 and the fourth source driver group 164) are darker than the display screen A of the local source driver group (that is, source driver group 162 and the third source driver group 163).

To solve the problems, embodiments of the present application provides a data signal regulating circuit and a display device which are detailed in the following embodiments.

Figure 2:
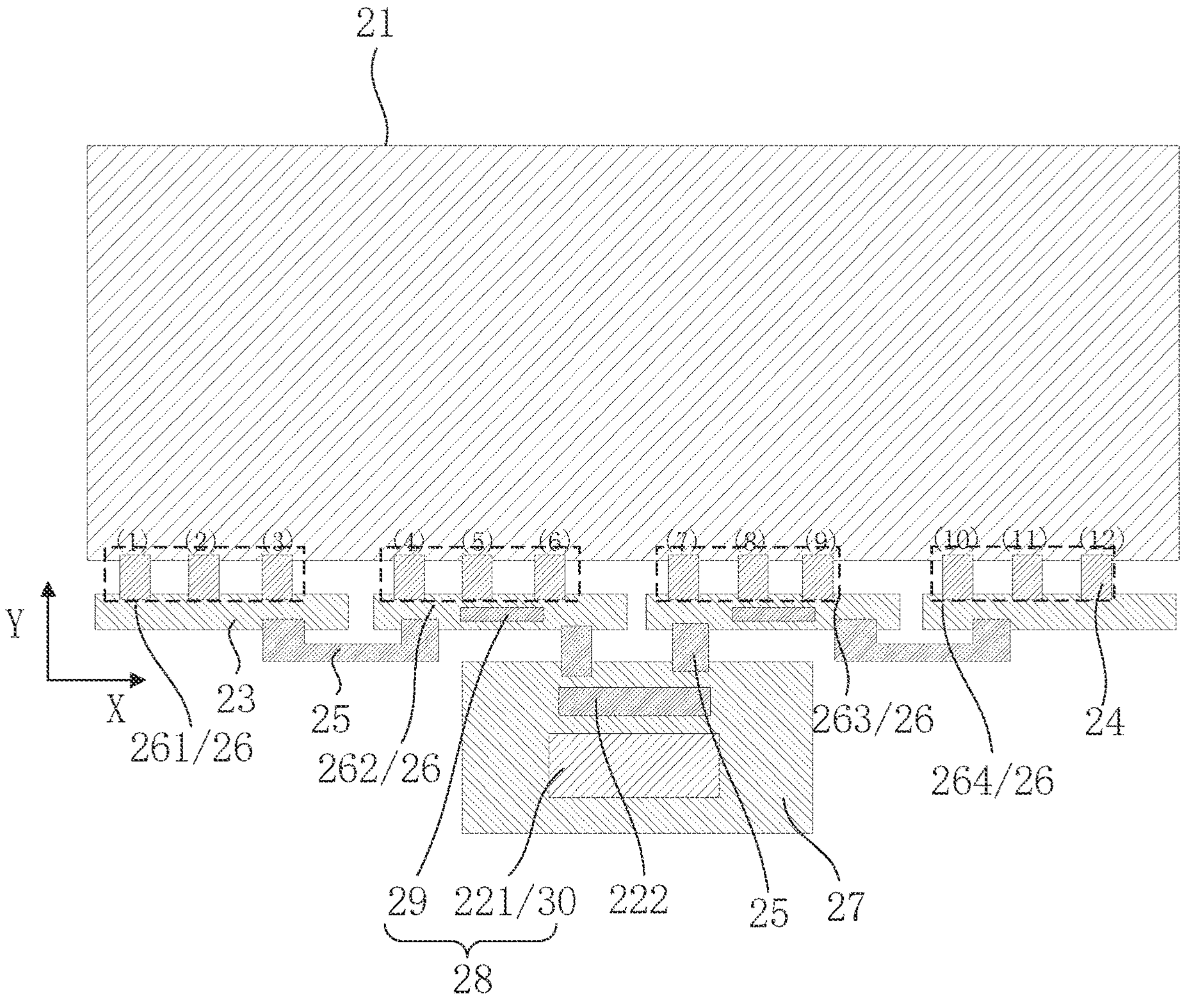
FIG. 2 is a schematic diagram showing a structural view of a display panel and a data signal regulating circuit provided by an embodiment of the present application.
Figure 3:
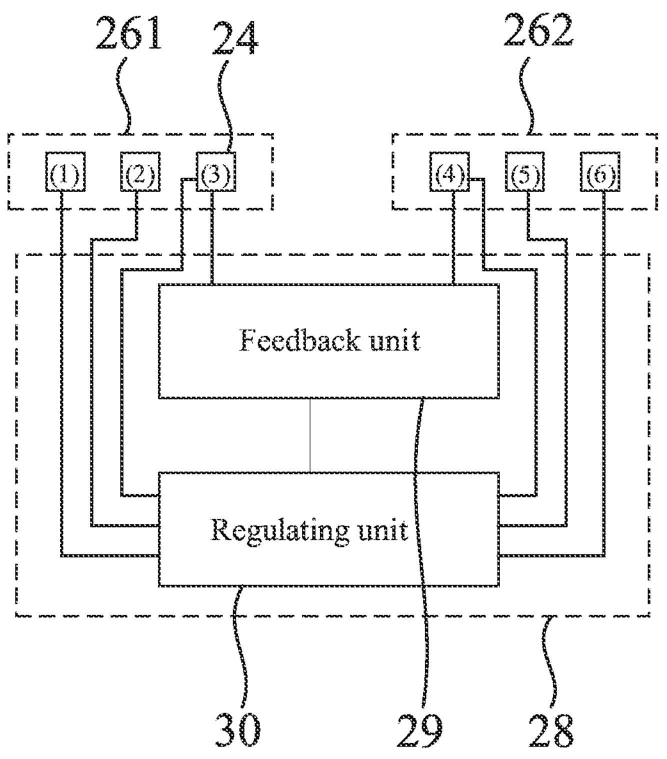
FIG. 3 is a schematic diagram showing a structural view of a data signal regulating circuit provided by embodiments of the present application.

As shown in FIG. 2 and FIG. 3, an embodiment of the present application provides a data signal regulating circuit 28 applied to a display panel 21, wherein the display panel 21 includes a plurality of source driver groups 26 arranged sequentially in a predetermined direction (X direction). Each source driver group 26 includes at least one source driver unit 24. Any two adjacent ones of source driver groups 26 are correspondingly provided with a data signal regulating circuit.

It should be noted that the display panel 21 in this embodiment may have the same structure as the display panel 11 shown in FIG. 1, but not limited thereto. The raw data signal of the display panel 21 in this embodiment is generated by the source driver unit 24 driven by the driver circuit (not shown), where the driver circuit includes the timing control unit 221 and the gamma voltage generation unit 222 provided on the circuit board 27. Additionally, the predetermined direction in this application embodiment is the X direction in the drawings.

For the convenience of description, only four source driver groups 26 are shown in FIG. 2, and each source driver group 26 includes three source driver units 24. However, the number of source driver groups 26 and source driver units 24 in an actual manufacture process is not limited hereto. The three source drive units 24 are arranged in a one-dimensional array in a predetermined direction (X direction). The four source driver groups 26 are, from left to right, the first source driver group 261, the second source driver group 262, the third source driver group 263, and the fourth source driver group 264. A plurality of source driver units 24 in the first source driver group 261, the second source driver group 262, the third source driver group 263, and the fourth source driver group 264 are arranged in the X direction from left to right and denoted by (1) to (12) in order. The timing control unit 221 and the gamma voltage generation unit 222 in the drive circuit are provided corresponding to the second source driver group 262 and the third source driver group 263. In particular, the gamma voltage generation unit 222 transmits raw gamma voltage outward to source drive units 24 respectively in the first source driver group 261, the second source driver group 262, the third source driver group 263 and the fourth source driver group 264, to cause the plurality of source drive units 24 to output the raw data signal.

It is understood that according to distances of the transmission paths of the original gamma voltage, the second source driver group 262 and the third source driver group 263 may be grouped as the local source driver group, and the first source driver group 261 and the fourth source driver group 264 may be grouped as the remote source driver group. It should be noted that the number of local source driver groups and the number of remote source driver groups in the application can be determined according to an actual manufacture process and the distance from the gamma voltage generation unit 222, and are not limited hereto.

Specifically, the data signal regulating circuit 28 includes a feedback unit 29 and an regulating unit 30. The feedback unit 29 is electrically connected to two corresponding adjacent source driver groups 26 respectively, obtains data signal difference between the two adjacent source driver groups 26, and outputs a feedback signal to the regulating unit 30 according to the data signal difference. The regulating unit 30 is also electrically connected to the two corresponding adjacent source driver groups 26 respectively, and outputs regulation signals to the two corresponding adjacent source driver groups 26 respectively according to the feedback signals, to regulate the data signals output by the plurality of source driver units 24 in these two adjacent source driver groups 26.

As can be appreciated, the data signal difference may be the difference between the data signals output by two adjacent source driver groups.

In a specific embodiment, each source driver group 26 includes a plurality of source driver units 24 arranged sequentially in a predetermined direction. A plurality of source driver units 24 in the same source driver group 26 output identical data signals. The feedback unit 29 is electrically connected to any of the source driver units 24 in each of the two corresponding adjacent source driver groups 26. The regulating unit 30 is electrically connected to each of the source driver units 24 in the two corresponding adjacent source driver groups 26.

Taking the first source driver group 261 and the second source driver group 262 as an example, as shown in FIG. 3, the first source driver group 261 and the second source driver group 262 are correspondingly provided with a data signal regulating circuit 28. The feedback unit 29 in the data signal regulating circuit 28 is electrically connected to any one of the source driver units in the first source driver group 261 (e.g., source driver unit (3)) and any one of the source driver units in the second source driver group 262 (e.g., source driver unit (4)), obtains the data signal difference between the first source driver group 261 and the second source driver group 262, and outputs a feedback signal to the regulating unit 30 based on the data signal difference. The regulating unit 30 is electrically connected to the source driver units (1) to (3) in the first source driver group 261 and the source driver units (4) to (6) in the second source driver group 262 respectively, and simultaneously regulates the data signals output from the source driver units (1) to (6) to make the data signals output from the source driver units (1) to (6) identical, thereby eliminating the screen split phenomenon.

It should be noted that when the data signals output by multiple source driver units 24 in the same source driver group 26 are not identical, a data signal regulating circuit 28 can be provided between any two adjacent source driver units 24 to make the data signals output by any two adjacent source driver units 24 identical, so as to ameliorate the screen split phenomenon. In a specific embodiment, each source driver group 26 includes only one source driver unit 24, and a data signal regulating circuit 28 is provided between any two adjacent source driver units 24.

Figure 4:
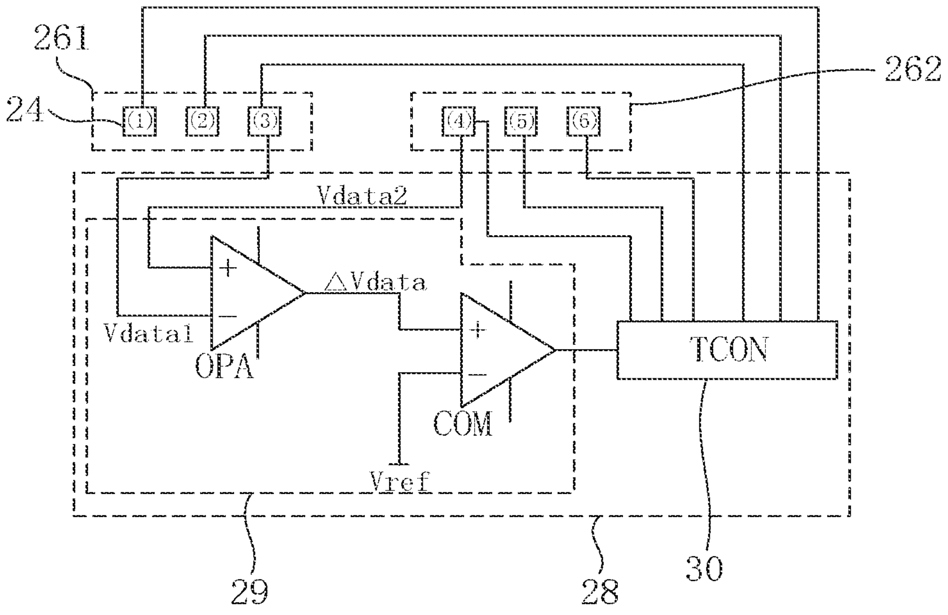
FIG. 4 is a schematic diagram showing a structural view of another data signal regulating circuit provided by embodiments of the present application.

As shown in FIG. 2 and FIG. 4, in a specific embodiment, the regulating unit 30 includes a timing control unit 221, i.e., TCON, and the regulating unit 30 is electrically connected to each of the corresponding source driver units 24 via a CPSI signal line, transmits a regulation signal to each of the corresponding source driver units 24 to directly regulate the data signal of each of the corresponding source driver units 24. Specifically, the regulation signal is an N/P signal containing gray-scale data. Of course, signal lines between the regulating unit 30 and the source driver unit 24 can also be a P2P type signal line such as USIT or CEDS, and the types of signal lines are not limited hereto.

Specifically, as shown in FIG. 4, feedback unit 29 includes an interconnected operational amplifier OPA and a comparator COM. The operational amplifier OPA is used to receive data signals from two adjacent source driver groups (e.g., data signal Vdata1 of first source driver group 261 and data signal Vdata2 of second source driver group 262), detect and amplify the difference between the data signals of the two adjacent source driver groups, and obtain the amplified data signal difference ΔVdata. The comparator COM is used to compare magnitude of the amplified data signal difference ΔVdata with the reference voltage Vref, and to output a feedback signal to the regulating unit 30 when the amplified data signal difference ΔVdata deviates from the reference voltage Vref. In a specific embodiment, the reference voltage Vref is greater than or equal to 0, and the amplified data signal difference ΔVdata is greater than or equal to 0. When the amplified data signal difference ΔVdata is less than or equal to the reference voltage Vref, the comparator COM outputs a high voltage level signal. When the amplified data signal difference ΔVdata is greater than the reference voltage Vref, the comparator COM outputs a low voltage level signal. It can be understood that the regulating unit 30 outputs a regulation signal to the source driver unit 24 only when the comparator COM outputs a low level signal.

It should be noted that the value of the reference voltage Vref limits an allowable range of the amplified data signal difference ΔVdata. The reference voltage Vref may be usually set to be greater than or equal to 0, where the specific value of the reference voltage Vref can be set according to specific situations and is not limited hereto. The amplified data signal difference ΔVdata can be greater than 0 or less than 0, or equal to 0. When an absolute value of the amplified data signal difference ΔVdata is less than or equal to the reference voltage Vref, no screen splitting will occur, and the original data signals output from the source driver units require no regulation. When the absolute value of the amplified data signal difference ΔVdata is greater than the reference voltage Vref, which means that the difference between the original data signals output from the two adjacent source driver groups is too large, and a screen split phenomenon will occur. At this time, the original data signals output from the source driver unit need regulation. As can be understood, the deviation of the amplified data signal difference ΔVdata from the reference voltage Vref means may be represented by the absolute value of the amplified data signal difference ΔVdata greater than the reference voltage Vref.

Specifically, the amplification ratio of the operational amplifier OPA may be configured according to an actual situation and is not limited hereto.

Specifically, the first input and the second input of the operational amplifier OPA are electrically connected to the two corresponding adjacent source driver groups, and output of the operational amplifier OPA is electrically connected to a first input of the comparator COM. A second input of the comparator COM is connected to the reference voltage Vref, and an output of the comparator COM is electrically connected to the regulating unit 30.

Specifically, in one specific embodiment, the first input of the operational amplifier OPA is a non-inverting input (+), and the second input of the operational amplifier OPA is an inverting input (−). Of course, in another specific embodiment, the first input of the operational amplifier OPA may be an inverting input (−), and the second input of the operational amplifier OPA may be a non-inverting input (+), which is not limited hereto. Similarly, the first input of the comparator COM may be an non-inverting input (+), and the second input of the comparator COM may be an inverting input (−). Of course, in another specific embodiment, the first input of the comparator COM may be an inverting input (−), and the second input of the comparator COM is an non-inverting input (+), which is not limited hereto.

When the gamma voltage generation unit 222 outputs identical raw gamma voltage to the plurality of source driver groups 26, and the raw gamma voltage received by the remote source driver group and the local source driver group is different due to the voltage drop, the raw data signals output by the corresponding source driver units 24 may be different, resulting in a screen split phenomenon when the display panel operates to display. However, after being regulated by the data signal regulating circuit 28 provided by the present application, the data signals output by the source driver units 24 in the two adjacent source driver groups 26 are identical, and multiple pixels in the display panel 21 display the same grayscale screen, so that the screen split phenomenon does not occur.

Figure 5:
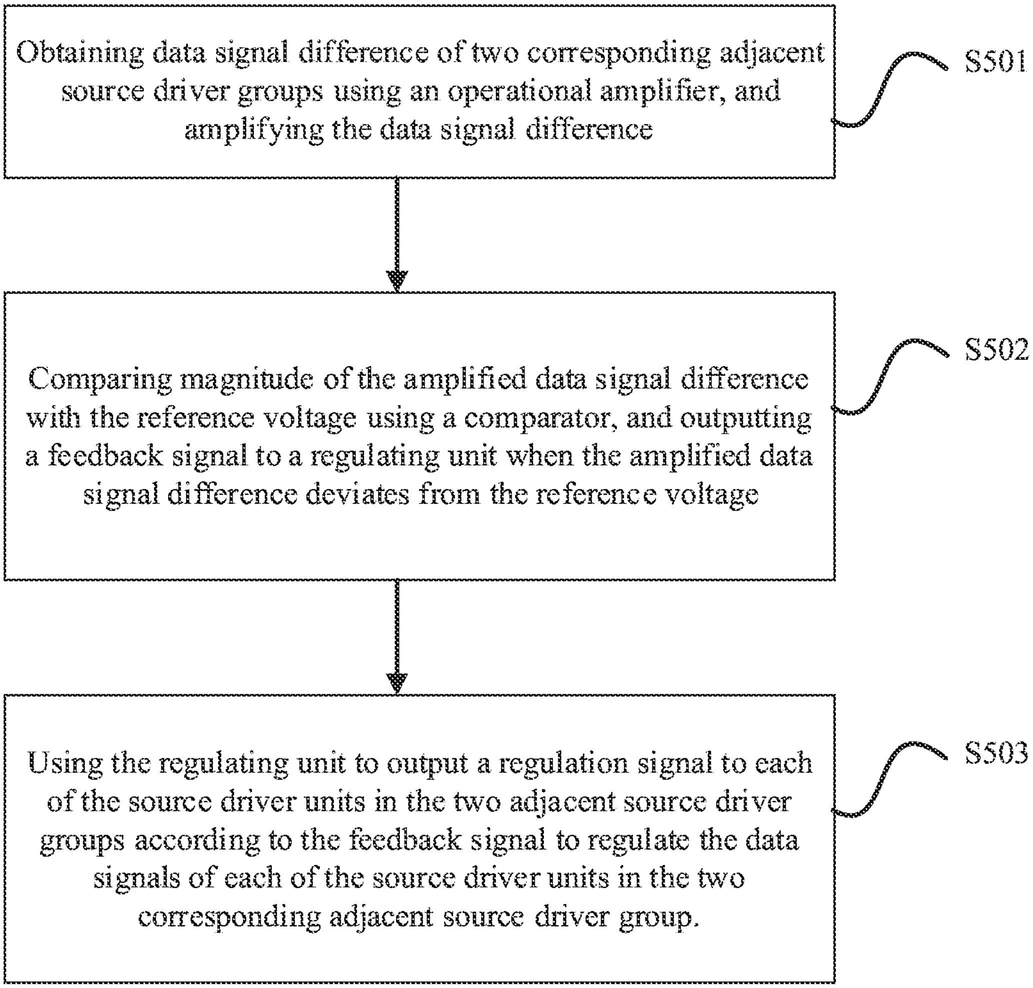
FIG. 5 is a schematic diagram showing a flow of a data signal regulating method provided by embodiments of the present application.

As shown in FIG. 5, the method of regulating the data signals of the display panel 21 using the data signal regulating circuit 28 provided in this application embodiment includes steps S501 to S503.

S501: Obtaining the data signal difference of the two corresponding adjacent source driver groups using an operational amplifier, and amplifying the data signal difference;

S502: Comparing magnitude of the amplified data signal difference with the reference voltage using a comparator, and outputting a feedback signal to the regulating unit when the amplified data signal difference deviates from the reference voltage; and

S503: Using the regulating unit to output a regulation signal to each of the source driver units in the two adjacent source driver groups according to the feedback signal to regulate the data signals of each of the source driver units in the two corresponding adjacent source driver group.

The data signal regulating circuit 28 provided in this application embodiment can timely regulate the data signals output by the two adjacent source driver units 24 in the display panel 21, so that the data signals output by different source driver units 24 are identical, effectively ameliorating the screen split phenomenon.

Figure 6:
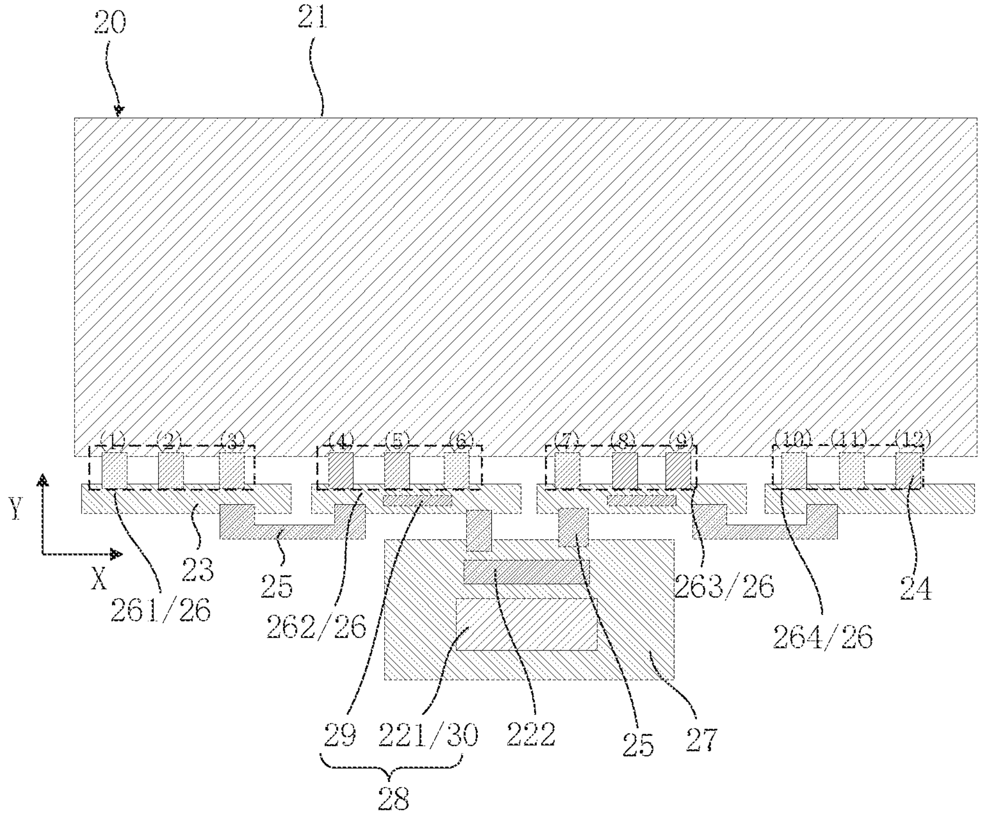
FIG. 6 is a schematic diagram showing a structural view of a display device provided by embodiments of the present application.

As shown in FIG. 6, the present application also provides a display device 20, which includes a display panel 21 and a data signal regulating circuit 28 in the above embodiment. In particular, the data signal regulating circuit 28 is located on one side of the display panel 21.

Specifically, the display device 20 further includes a plurality of printed circuit boards 23 arranged sequentially in a predetermined direction, and a plurality of source driver groups 26 are provided on the plurality of printed circuit boards 23 in one to one correspondence, or lapped on the plurality of printed circuit boards 23 in one to one correspondence. Further, the feedback unit 29 and any one of the two corresponding adjacent source driver groups 26 are provided on the same printed circuit board 23.

Specifically, the display device 20 further includes a circuit board 27 electrically connected to a plurality of printed circuit boards 23. The circuit board 27 has a gamma voltage generation unit 222. The gamma voltage generation unit 222 respectively provides a raw gamma voltage to the source driver unit 24 in the plurality of source driver groups 26 via a flexible line 25 connecting the plurality of printed circuit boards 23 and the circuit board 27.

Specifically, the printed circuit board 23 near the gamma voltage generation unit 222 is electrically connected to the circuit board 27 via the flexible line 25. Other adjacent printed circuit boards 23 are electrically connected to each other via the flexible line 25 so that the raw gamma voltage generated by the gamma voltage generation unit 222 can be transmitted to the source driver unit 24 on each of the printed circuit boards 23.

As can be understood, the difference between the display device 20 provided by the embodiments of the present application and the example of the display device 10 shown in FIG. 1 is that the display device 20 provided by embodiments of the present application provides a data signal regulating circuit 28 to the original driving circuit, and the data signal regulating circuit 28 shares a timing control unit 221 with the driving circuit, and the feedback unit 29 in the data signal regulating circuit 28 and either of the two corresponding source driver groups 26 are located on the same printed circuit board 23. For example, the second source driver group 262 and the feedback unit 29 corresponding to the first source driver group 261 and the second source driver group 262 are provided on the same printed circuit board 23.

In this embodiment, the data signal regulating circuit 28 can timely regulate the data signals output by the two adjacent source driver units 24 in the display panel 21 so that the data signals output by different source driver units 24 are identical, effectively ameliorating the screen split phenomenon, thereby improving display performance of the display device 20.

The data signal regulating circuit and display device in the embodiments are detailed to facilitate understanding of the method and core ideas of this application. Additionally, a person with ordinary skills in the art may modify the embodiments and applications according to the ideas of this application. In summary, the content of this specification should not be construed as a limitation of this application.

What is claimed is:

1. A data signal regulating circuit for a display panel, wherein the display panel comprises a plurality of source driver groups arranged sequentially in a predetermined direction, each of the source driver groups comprises a plurality of source driver units arranged sequentially in the predetermined direction, source driver units in the same source driver group output identical data signals, and any two adjacent ones of the source driver groups are correspondingly provided with an instance of the data signal regulating circuit;

the data signal regulating circuit comprises an electrically interconnected feedback unit and a regulating unit;

the feedback unit is further respectively electrically connected to any one of the source driver units in each of the two corresponding adjacent source driver groups, and configured to obtain data signal difference of the two adjacent source driver groups and output a feedback signal to the regulating unit based on the data signal difference; and the regulating unit is further respectively electrically connected to each of the source driver units in the two corresponding adjacent source driver groups, and configured to respectively output a regulation signal to each of the source driver units in the two adjacent source driver groups, to regulate data signals output by the two adjacent source driver groups according to the feedback signal.

2. The data signal regulating circuit according to claim 1, wherein the data signals output by the two adjacent source driver groups are identical after being regulated by the data signal regulating circuit.

3. The data signal regulating circuit according to claim 1, wherein the feedback unit comprises an electrically interconnected operational amplifier and a comparator;

the operational amplifier is configured to detect and amplify the data signal difference of the two adjacent the source driver groups; and the comparator is configured to compare magnitude of the amplified data signal difference with a reference voltage, and to output the feedback signal to the regulating unit when the amplified data signal difference deviates from the reference voltage.

4. The data signal regulating circuit according to claim 3, wherein the feedback signal comprises a low voltage level signal.

5. The data signal regulating circuit according to claim 3, wherein a first input and a second input of the operational amplifier are electrically connected to two corresponding adjacent the source driver groups, and an output of the operational amplifier is electrically connected to a first input of the comparator;

a second input of the comparator is connected to the reference voltage, and an output of the comparator is electrically connected to the regulating unit.

6. The data signal regulating circuit according to claim 1, wherein the regulating unit comprises a timing control unit.

7. The data signal regulating circuit according to claim 1, wherein the regulation signal comprises gray scale data.

8. A display device comprising a display panel and the data signal regulating circuit as claimed in claim 1, the data signal regulating circuit being located on one side of the display panel.

9. The display device according to claim 8, wherein the data signals output by the two adjacent source driver groups are identical after being regulated by the data signal regulating circuit.

10. The display device according to claim 8, wherein the feedback unit comprises an electrically interconnected operational amplifier and a comparator;

the operational amplifier is configured to detect and amplify the data signal difference of the two adjacent the source driver groups; and the comparator is configured to compare magnitude of the amplified data signal difference with a reference voltage, and to output the feedback signal to the regulating unit when the amplified data signal difference deviates from the reference voltage.

11. The display device according to claim 10, wherein a first input and a second input of the operational amplifier are electrically connected to two corresponding adjacent the source driver groups, and wherein an output of the operational amplifier is electrically connected to a first input of the comparator;

a second input of the comparator is connected to the reference voltage, and an output of the comparator is electrically connected to the regulating unit.

12. The display device according to claim 8, wherein the regulating unit comprises a timing control unit.

13. The display device according to claim 8, wherein the display device further comprises a plurality of printed circuit boards arranged sequentially in the predetermined direction, the plurality of source driver groups being provided on the plurality of printed circuit boards in one to one correspondence; and the feedback unit and any one of the two adjacent the source driver groups are provided on the same the printed circuit board.

14. The display device according to claim 13, wherein the display device further comprises a gamma voltage generation unit electrically connected to the plurality of printed circuit boards, the gamma voltage generation unit provides a raw gamma signal to each of the plurality of source driver groups through the plurality of printed circuit boards.

15. The display device according to claim 13, wherein at least two adjacent printed circuit boards are electrically interconnected through a flexible line.

16. The display device according to claim 8, wherein the regulation signal comprises gray scale data.

* * * * *